United States Patent [19]
Coppola et al.

[11] Patent Number: 5,162,386
[45] Date of Patent: Nov. 10, 1992

[54] AMINE CATALYST SYSTEM FOR WATER-BLOWN POLYURETHANE FOAM

[75] Inventors: Pasquale J. Coppola, Meriden; Leny O. Petteway, Jr., Waterbury, both of Conn.

[73] Assignee: BASF Corporation, Parsippany, N.J.

[21] Appl. No.: 694,162

[22] Filed: May 1, 1991

[51] Int. Cl.$^5$ ............................................. C08G 18/20
[52] U.S. Cl. .................................................... 521/129
[58] Field of Search ........................................ 521/129

[56] References Cited

U.S. PATENT DOCUMENTS

| | | | |
|---|---|---|---|
| 4,617,286 | 10/1986 | Arai et al. | 521/129 |
| 4,910,230 | 3/1990 | Tamano et al. | 521/129 |
| 5,039,713 | 8/1991 | Petrella | 521/129 |
| 5,057,480 | 10/1991 | Petrella | 521/129 |

FOREIGN PATENT DOCUMENTS 0322801 7/1989 European Pat. Off. .

*Primary Examiner*—Morton Foelak
*Assistant Examiner*—Rabon Sergent
*Attorney, Agent, or Firm*—Martin P. Connaughton

[57] ABSTRACT

The present invention relates to an improved essentially closed cell polyurethane foam comprising the reaction product of at least one polyol with at least one isocyanate, in the presence of water to provide a carbon dioxide blowing agent, the improvement comprising said reaction being effected in the presence of a catalyst system consisting essentially of N,N,N',N''', N''-pentamethyl-diethylenetriamine and triethylene diamine in order to provide a polyurethane foam characterized by enhanced shrinkage resistance. Also claimed is a process for producing this foam.

9 Claims, No Drawings

AMINE CATALYST SYSTEM FOR WATER-BLOWN POLYURETHANE FOAM

FIELD OF THE INVENTION

This invention relates generally to polyurethane foams, and, more specifically, to such foams which are made utilizing a specific amine catalyst system and water to provide a carbon dioxide-blown foam.

BACKGROUND OF THE INVENTION

In the production of polyurethane foams, a polyol is reacted with a polyisocyanate in the presence of a polyurethane catalyst and a blowing agent. It is well-established in the art that open-cell foams can be produced using water in the reaction mixture to provide a carbon dioxide blowing agent in situ, whereas closed-cell foams are typically produced using a chlorofluorocarbon ("CFC") blowing agent. Unfortunately, CFC blowing agents have a negative impact on the environment, and alternatives to the use of these blowing agents in the production of closed-cell foams are being sought by the polyurethanes manufacturing community.

Unfortunately, the use of amine catalysts as supplemental catalysts in combination with water to provide closed cell foams (e.g., rigid and semi-rigid foams) has heretofore not been successful to the knowledge of the present inventors, largely due to a shrinkage problem associated with the production and storage of such foams. A solution to this shrinkage problem would be highly desired by the polyurethanes manufacturing community.

SUMMARY OF THE INVENTION

In one aspect, the present invention relates to an improved essentially closed cell polyurethane foam comprising the reaction product of at least one polyol with at least one isocyanate, in the presence of water to provide a carbon dioxide blowing agent, the improvement comprising said reaction being effected in the presence of a catalyst system consisting essentially of N,N,N',N'',N''-pentamethyl-diethylenetriamine and triethylene diamine in order to provide a polyurethane foam characterized by enhanced shrinkage resistance. In another aspect, the present invention relates to an improved essentially closed cell polyurethane foam wherein the catalyst system additionally contains N-methyl,N'-dimethylaminoethyl-piperazine.

In yet another aspect, the present invention relates to a process for producing an essentially closed cell polyurethane foam which comprises reacting a polyol with an isocyanate, in the presence of water to provide a carbon dioxide blowing agent, and in the presence of an amine catalyst system consisting essentially of N,N,N',N'',N''-pentamethyl-diethylenetriamine and triethylene diamine in order to provide a polyurethane foam characterized by enhanced shrinkage resistance. In still another aspect, the present invention relates to a process for producing an essentially closed cell polyurethane foam wherein the catalyst system additionally contains diethylenetriamine.

These and other aspects will become apparent upon reading the following detailed description of the invention.

DETAILED DESCRIPTION OF THE EMBODIMENT

The fabrication of the foam requires the preparation of the foam-forming composition of the invention. This is readily accomplished by bringing together the polyisocyanate, the polyol, the catalyst, the blowing agent, and any other additives (as discussed hereinafter), using agitation means sufficient to ensure homogeneity in the resultant mixture. The mixing of the components can be carried out by hand, when operating on a small scale, but is advantageously carried out using the various mixing and dispensing machines conventionally employed in the manufacture of polymer foams.

Immediately after completion of mixing of the components, the foam reaction mix is poured or dispensed directly into the appropriate mold and foaming is allowed to take place in the mold in accordance with procedures well recognized in the art for the molding of polymer foams.

In a preferred embodiment, a "one-shot" method of foam fabrication is employed, whereby the isocyanate containing stream (commonly referred to as the "A-side") and the polyol-containing and catalyst-containing stream (commonly referred to as the "B-side") are mixed. Each of these streams are preferably liquids in which all of the various additives are preferably soluble, although dispersions utilizing solid components can be employed if desired. In accordance with a more preferred embodiment of the present invention, the B-side contains polyol, blowing again, and a surfactant to assist in foam cell formation.

A typical "B-side" formulation is prepared by blending:

POLY-G 70-460, (a sucrose-diethanolamine-based ethoxylated polyol), a product of Olin Corporation; 100.0 grams Q2-5125 (a silicone surfactant), a liquid product of Dow Chemical Corporation; 2.0 grams Amine Catalysts; 0.5 grams Fluorocarbon R-11B (a trichloromonofluoro-methane blowing agent), a product of E. I. DuPont de Nemours & Company, Inc.; 45.0 grams After thorough mixing of these components at room temperature, the resulting blend forms a clear solution having a viscosity of about 100 cps at room temperature.

The polyols which are used in the subject invention are well known in the art and are generally referred to as polyoxyalkylene polyether polyols. These polyols are prepared by the reaction of an alkylene oxide with polyhydric or polyamine-containing compounds, or mixtures thereof. Alkylene oxides which may be employed in the preparation of the polyols of the present invention include ethylene oxide, propylene oxide, butylene oxide, styrene oxide and the like. Halogenated alkylene oxides may also be used such as epichlorohydrin, 3,3,3-trichlorobutylene oxide, etc. Mixtures of any of the above alkylene oxides may also be employed. The preferred alkylene oxide is ethylene oxide.

Polyoxyalkylene polyether polyols generally contain either primary or secondary hydroxyl groups, or mixtures thereof. These polyols are suitably prepared by reacting an active-hydrogen containing compound, such as polyhydric compounds or polyamines, with the above-described alkylene oxides. Useful polyhydric compounds include ethylene glycol, propylene glycol, diethylene glycol, dipropylene glycol, glycerol, pentaerythritol, sorbitol, sucrose, methyl glucoside, glucose, etc. The preferred polyols are the polyoxyalkylene polyether polyols.

The polyol is employed in a proportion corresponding to between about 0.5 and about 1.2 equivalents per equivalent of polyisocyanate. Preferably, the polyol is employed in a proportion corresponding to between about 0.8 and about 1.0 equivalents per equivalent of polyisocyanate. Below the lower limit of about 0.5 equivalent of polyol per equivalent of polyisocyanate, the resulting foam is expected to be excessively friable. Above the upper limit of about 1.2 equivalents of polyol per equivalent of polyisocyanate, the resulting foam is expected to undergo excessive interior scorching and associated foam cell structure degradation during fabrication due to the increased exotherm of reaction by the additional polyol.

By "equivalents" of polyol is meant the molecular weight divided by the number of hydroxyl groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups.

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate 1,5-napthalene diisocyanate, p-phenylene diisocyanate, 1,4-diethylbenzene diisocyanate and other di- and higher polyisocyanates such as those listed in the tables of Siefken, Ann. 562, 122-135 (1949). Mixtures of two or more of the above isocyanates can be used, such as mixtures of the 2,4- and 2,6-isomers of tolylene diisocyanate, mixture of the 2,4'- and 4,4'-isomers of methylenebis(phenyl isocyanate) and the like. In addition to the 4,4'-methylenebis (phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 15° C. or higher.

Illustrative of another modified form of 4,4'-,methylenebis(phenyl isocyanate) which can form the polyisocyanate component is the product obtained by treating the former compound, or mixtures thereof with small portions of 2,4'-isomer, with a minor portion of a carbodimide such as diphenylcarbodiimide. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylenebis(phenyl isocyanate) with polymethylene polyphenyl isocyanates of higher functionality. Such mixtures are generally those obtained by phosgenation or corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The amount of amine catalysts employed in the compositions of the present invention is a "catalytically effective" amount, i.e., an amount sufficient to catalyze the reaction of the polyisocyanate and the polyol to form polyurethane linkages. These amine catalysts are preferably employed in a total amount of between about 0.1 and about 3.0, more preferably between about 0.1 and about 0.3, weight percent based on the weight of the total composition.

If desired, an organometallic catalyst may be employed in the reaction between an isocyanate group and an active hydrogen-containing group can be employed in the compositions of the present invention. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. The preferred group of said organometallic derivatives is that derived from tin. Examples of this preferred group are: dibutyltin diacetate, dibutyltin dilaurate stannous octoate, stannous oleate, and the like.

The blowing agent employed in the process of the present invention is carbon dioxide produced in situ by means of the presence of water in the reaction mixture. Preferably, the water comprises between about 5 and about 20 weight percent based on the weight of the composition.

Optional additives such as dispersing agents, cell stabilizers, surfactants, flame retardants, and the like, which are commonly employed in the fabrication of polymer foams, can be employed in the process of the invention. For example, the well-known phosphorus-based flame retardant additives may be used if flame retardancy is desired. Non-reactive flame retardants usually soften and weaken a rigid foam due to their plasticizing nature. They usually do adversely affect the properties. As another illustration, a finer cell structure may be obtained if organosilicone polymers are used as surfactants in the reaction mix. Organosilicone polymers obtained by condensing a polykoxypolysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture. If used, the surfactant is preferably employed in an amount of between about 0.2 and about 5.0 weight percent based on the weight of the composition.

Other optional additives, such as inorganic and organic fillers, can be employed in the process of this invention. Illustrative inorganic fillers are calcium carbonate, silica, glass, antimony oxides, etc. Illustrative organic fillers are the various polymers, copolymers of vinyl chloride, vinyl acetate, acrylonitrile, styrene, melamine, partially oxyalkylated melamine, etc. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

The foams made in accordance with the present invention are generally rigid, although semi-rigid and flexible foams are also intended to be within the scope of the invention. The cellular foams made in accordance with the present invention generally have a density of between about 0.5 and about 6 pcf, preferably between about 1 and about 3 pcf.

The cellular products of the invention can be employed for all the purposes for which the currently produced cellular products are conventionally employed, but as noted above are particularly suitable for applications where higher hydrolysis resistance is required.

The following examples are intended to illustrate, but in no way limit, the scope of the present invention.

EXAMPLES 1 and 2

Isocyanate and resin blends were prepared and combined at the requisite isocyanate: resin ratio for the particular formulation being investigated. Enough of the isocyanate and resin were used to insure that the foam would rise over the top of the mold (N 300 grams of total mix). The isocyanate and resin were handmixed for 5–8" using a 7500 RPM mixer.

The mixed foam was then poured into a 12"×12"×15" high, 1" thick, 90 degree "L"-shaped wooden mold lined with polyethylene film (the film was used to insure release and minimize distortion of the 90 degree angle upon demolding). The molds were kept at room temperature (about 73°–75° F.). The mold was uncapped, thereby allowing the foam to rise over the top unobstructed. The foam was poured into a hole in the base of the "L", "4" from the front of the mold, and the hole then plugged. After 6 minutes, the excess foam at the top of the mold was cut flush to the top and the "L" panel demolded.

The "L"- panels were then stored at room temperature ($-73°$–$75°$ F.) and observed for shrinkage and angle distortion. Angle distortions of 0–5 degrees were considered slight, 5–15 degrees were considered moderate and >15 degrees considered severe distortion. Shrinkage observations were made based upon visual observations of the foam. The less the shrinkage and distortion, the more stable the foam.

The results are presented in Table I. The results indicate that the foams of Examples 1 and 2 provide superior foam characteristics in terms of low foam shrinkage and low foam distortion, relative to the comparison foams A-D made using a conventional amine catalyst.

TABLE I

| Formulation Components | Comparison A % by wt | Comparison B % by wt | Comparison C % by wt | Comparison D % by wt | Example 1 % by wt | Example 2 % by wt |
|---|---|---|---|---|---|---|
| POLY-G ® 71-357[1] | 18.7 | 18.1 | 20.6 | 20.6 | 18.7 | 18.7 |
| VORANOL 370[2] | 5.2 | 5.0 | 7.7 | 5.6 | 5.2 | 5.2 |
| POLY-G ® 30-168[3] | — | — | — | 7.9 | — | — |
| POLY-G ® 70-600[4] | 6.7 | 6.7 | — | — | 6.7 | 6.7 |
| SANTICIZER 160[5] | — | — | 5.6 | — | — | — |
| L-5420[6] | 0.5 | 0.5 | 0.6 | 0.6 | 0.6 | 0.6 |
| DABCO D33LV[7] | 0.2 | — | — | 0.2 | — | — |
| SA-102[8] | — | 0.7 | — | — | — | — |
| DABCO R-8020[9] | — | — | 0.8 | — | — | — |
| POLYCAT 8[10] | — | — | — | 0.4 | — | — |
| TOYOCAT B-6[11] | — | — | — | — | 0.1 | — |
| TOYOCAT B-7[12] | — | — | — | — | — | 0.1 |
| WATER | 2.0 | 2.3 | 2.2 | 2.2 | 2.0 | 2.0 |
| POLYMERIC ISOCYANATE[13] | 66.7 | 66.7 | — | — | 66.7 | 66.7 |
| HIGH FUNCTIONALITY POLYMERIC ISOCYANATE[14] | — | — | 62.5 | 62.5 | — | — |
| Formulation | | | | | | |
| Ratio "A"/"B" | 100/50 | 100/50 | 100/60 | 100/60 | 100/50 | 100/50 |
| Index | 1.11 | 1.04 | 1.08 | 1.08 | 1.11 | 1.11 |
| Free Rise Density | 1.57 | 1.43 | 1.58 | 1.52 | 1.50 | 1.54 |
| Results | | | | | | |
| Free Rise Shrinkage | Severe | Severe | Severe | Severe | Very slight | Very slight |
| "L" panel Shrinkage | Moderate @ 1 day | Moderate @ 1 week | Severe @ 1 week | Severe @ 1 week | Slight-Modrt @ 10 weeks | Slight @ 11 weeks |
| "L" panel Angle | Severe @ | Severe @ | Severe @ | Severe @ | Slight @ | Very Slight @ |

TABLE I-continued

| Formulation Components | Comparison A % by wt | Comparison B % by wt | Comparison C % by wt | Comparison D % by wt | Example 1 % by wt | Example 2 % by wt |
| --- | --- | --- | --- | --- | --- | --- |
| Distortion | 1 day | 1 week | 1 week | 1 week | 10 weeks | 11 weeks |

[1] A sucrose-aliphatic amine based polyol having a hydroxyl number of 350, a product of Olin Corporation
[2] A propoxylated sucrose/glycerin polyol having a hydroxyl number of 370, a product of DOW Chemical Corporation
[3] A Glycerin/PO polyol having a hydroxyl number of 168, MW-1000 and a functionality of 3, a product of Olin Corporation
[4] A diethanolamine-ethylene oxide based polyol having a hydroxyl number of 600, functionality of 3, a product of Olin Corporation
[5] A butyl benzyl phthalate; a product of Monsanto Corporation
[6] A polyalkyleneoxidemethylsiloxane copolymer (surfactant), a product of Union Carbide Corporation
[7] A triethylenediamine in Dipropylene glycol, catalyst; a product of Air Products
[8] A polyurethane catalyst; a product of Air Products
[9] A mixture of Triethylenediamine and Dimethylethanolamine (20/80%) catalyst; a product of Air Products
[10] A N,N-Dimethylcyclohexylamine catalyst; a product of Air Products
[11] Triethylene Diamine and N,N,N',N'',N''-Pentamethyl-Diethylenetriamine
[12] Triethylene Diamine, N,N,N',N'',N''-Pentamethyl-Diethylenetriamine and N-Methyl, N' Dimethylaminoethyl-Piperazine
[13] Aromatic isocyanate (crude MDI products); In Comparison A LUPRANATE M20 was used, a product of BASF; In Comparison B RUBINATE M was used, a product of ICI; In Example 1 RUBINATE M was used, a product of ICI; and In Example 2 LUPRANATE M20 was used, a product of BASF
[14] A Mondur 489 High Functionality aromatic isocyanate; a product of Mobay

What is claimed is:

1. An improved essentially closed cell polyurethane foam composition comprising the reaction product of at least one polyol with at least one isocyanate, in the presence of about 2 weight percent to about 20 weight percent, based upon the weight of the composition, of water to provide a carbon dioxide blowing agent, the improvement comprising said reaction being effected in the presence of a catalyst system consisting essentially of N,N,N',N'',N''-pentamethyl-diethylenetriamine and triethylene diamine in order to provide a polyurethane foam characterized by enhanced shrinkage resistance.

2. An improved essentially closed cell polyurethane foam composition comprising the reaction product of at least one polyol with at least one isocyanate, in the presence of about 2 weight percent to about 20 weight percent, based upon the weight of the composition, of water to provide a carbon dioxide blowing agent, the improvement comprising said reaction being effected in the presence of a catalyst system consisting essentially of N,N,N',N'',N''-pentamethyl-diethylenetriamine, triethylene diamine and N-methyl,N'-dimethylaminoethyl-piperazine in order to provide a polyurethane foam characterized by enhanced shrinkage resistance.

3. The composition of claim 1 wherein said water is present in an amount of between about 5 weight percent and about 20 weight percent based upon the weight of the composition.

4. The composition of claim 1 wherein said N,N,N',N'',N''-pentamethyl-diethylenetriamine and triethylene diamine are present in a total amount of between about 0.1 and about 3 weight percent present based upon the weight of the composition.

5. The composition of claim 1 which additionally comprises a surfactant.

6. A process for producing an essentially closed cell polyurethane foam which comprises reacting a polyol with an isocyanate, in the presence of about 2 weight percent to about 20 weight percent, based upon the weight of the composition, of water to provide a carbon dioxide blowing agent, and in the presence of an amine catalyst system consisting essentially of N,N,N',N'',N''-pentamethyl-diethylenetriamine and triethylene diamine in order to provide a polyurethane foam characterized by enhanced shrinkage resistance.

7. The process of claim 6 wherein said water is present in an amount of between about 5 weight percent and about 20 weight percent based upon the weight of the composition.

8. The process of claim 6 wherein said N,N,N',N'',N''-pentamethyl-diethylenetriamine and triethylene diamine are present in a total amount of between about 0.1 and about 3 weight percent present based upon the weight of the composition.

9. The process of claim 6 which additionally comprises a surfactant.

* * * * *